United States Patent
Itoga et al.

(10) Patent No.: US 7,543,447 B2
(45) Date of Patent: Jun. 9, 2009

(54) CONTROL SYSTEM FOR TRAVELING WORKING VEHICLE

(75) Inventors: Kentaro Itoga, Abiko (JP); Kazunori Nakamura, Tsuchiura (JP); Tsuyoshi Nakamura, Tsuchiura (JP); Motoyuki Yabuuchi, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 202 days.

(21) Appl. No.: 11/632,768

(22) PCT Filed: Nov. 11, 2005

(86) PCT No.: PCT/JP2005/020710

§ 371 (c)(1),
(2), (4) Date: Jan. 18, 2007

(87) PCT Pub. No.: WO2006/064623

PCT Pub. Date: Jun. 22, 2006

(65) Prior Publication Data

US 2007/0204605 A1 Sep. 6, 2007

(30) Foreign Application Priority Data

Dec. 13, 2004 (JP) ............................. 2004-359648

(51) Int. Cl.
*F16D 31/02* (2006.01)
(52) U.S. Cl. .......................................... 60/431; 60/449
(58) Field of Classification Search ................... 60/431, 60/445, 449
See application file for complete search history.

(56) References Cited

U.S. PATENT DOCUMENTS

| | | | |
|---|---|---|---|
| 5,155,996 A | 10/1992 | Tatsumi et al. | |
| 6,183,210 B1 * | 2/2001 | Nakamura | .................. 60/431 |

FOREIGN PATENT DOCUMENTS

| | | |
|---|---|---|
| EP | 404 540 | 12/1990 |
| EP | 945 619 | 9/1999 |
| EP | 1 260 716 | 11/2002 |
| JP | 7-119506 | 5/1995 |
| JP | 7-103593 | 11/1995 |
| JP | 8-151658 | 6/1996 |
| JP | 2968668 | 8/1999 |
| JP | 2000-073812 | 7/2000 |
| JP | 2004-190582 | 7/2004 |
| JP | 2005-054414 | 3/2005 |
| JP | 2005-180259 | 7/2005 |

* cited by examiner

*Primary Examiner*—Michael Leslie
(74) *Attorney, Agent, or Firm*—Mattingly & Malur, P.C.

(57) ABSTRACT

A traveling working vehicle maintains fuel economy while ensuring a sufficient work rate in heavy-load work.

A torque control regulator 26 controls the absorption torque of a hydraulic pump 22 to ensure that it does not exceed a preset maximum absorption torque, and an accelerator pedal 12 commands a target revolution speed of an engine 1. Revolution speed deviation computing sections 52 and 62, a modification torque computing section 53, a modification revolution speed computing section 63, speed ratio computing sections 54 and 64, traveling state determining sections 55 and 65, and working state determining sections 56 and 66 determine an operating state of the traveling working vehicleBoth the pump base torque of the hydraulic pump 22 and the target revolution speed of the engine 1 are modified depending on the determination result of the state determining sections.

9 Claims, 5 Drawing Sheets.

CONTROL SYSTEM FOR TRAVELING WORKING VEHICLE

TECHNICAL FIELD

The present invention relates to a control system for a traveling working vehicle, such as a wheel loader or a telescopic handler, in which a traveling device is driven by an engine for traveling of the vehicle and a hydraulic pump is also driven by the engine to operate a working actuator, thereby performing predetermined work.

BACKGROUND ART

JP,B 7-103593 discloses a technique for improving fuel economy in a traveling working vehicle equipped with a hydraulic pump and a traveling device by changing the output characteristic of an engine and the torque of the hydraulic pump in a stepwise manner. The disclosed prior art will be described below.

The traveling working vehicle disclosed in JP,B 7-103593 includes an electronic controlled governor capable of changing the output characteristic of the engine in a stepwise manner, and an operating switch for outputting a mode selection signal. When an operator manipulates the operating switch and selects an M1 mode, the output characteristic of the engine is set to a general one that is the same as the conventional characteristic. When the operator selects other mode (any of M2 and M3 modes) than the M1 mode, the output characteristic of the engine is set to provide a smaller engine output torque than that in the M1 mode. Further, the traveling working vehicle includes two fixed displacement hydraulic pumps and a solenoid pilot cutoff valve for selectively connecting a delivery hydraulic line of one of those two hydraulic pumps to a drain circuit. When a transmission of the traveling device is shifted from a forward second speed (F2) to a forward first speed (F1) for excavation work in the state of the M2 mode being selected, an electric command is outputted to the solenoid pilot cutoff valve to unload the delivery hydraulic line of one of the two hydraulic pumps for a shift from 2-pump driving to 1-pump driving. Thus, when an operating mechanism hydraulic circuit is under high pressure (i.e., in the case of heavy-load work), a sufficient tractive force for traveling is ensured and the work rate is maintained. When the operating mechanism hydraulic circuit is under low pressure, a hydraulic load (pump absorption torque) is reduced from that in the case of 2-pump driving to distribute an engine output to the driving side for traveling at a higher ratio, whereby work performance can be ensured and fuel economy can be improved.

Japanese Patent No. 2968558 discloses such a technique that, when the sum of respective loads of a travel driving unit and an actuator is smaller than an engine output torque, a maximum absorption torque of a hydraulic pump is increased for distribution of the engine output torque to the operating mechanism side, and when the load sum is larger than the engine output torque, the maximum absorption torque of the hydraulic pump is reduced to ensure a large traveling torque for maintaining a large tractive force.

Patent Reference 2: Japanese Patent No. 2968558

DISCLOSURE OF THE INVENTION

Problems to be Solved by the Invention

However, the above-described known techniques have problems as follows.

The prior art disclosed in JP,B 7-103593 is intended to improve fuel economy by changing the output characteristic of the engine which is capable of reducing the engine output. Accordingly, the following problem occurs when an ordinary engine (universal engine) not capable of changing the engine output characteristic. In the case of heavy-load work, the work rate can be ensured by controlling the pump absorption torque, but the engine output cannot be reduced and the fuel economy cannot be improved.

Further, because two fixed displacement hydraulic pumps are used and the output for the operating mechanism side is controlled by selecting the 1-pump driving or the 2-pump driving, the pump capacity is selectable just corresponding to one pump or two pumps, and flexibility is not obtained in distribution of the engine output.

With the prior art disclosed in Japanese Patent No. 2968558, the maximum absorption torque of the hydraulic pump is controlled while just looking at the load state, and the engine side is not controlled. Accordingly, the fuel economy effect cannot be obtained.

An object of the present invention is to provide a traveling working vehicle which can improve fuel economy while ensuring a work rate in heavy-load work by using an ordinary engine, and which can obtain flexibility in distribution of an engine output.

Means For Solving The Problems (1) To achieve the above object, the present invention is constituted as follows. In a control system for a traveling working vehicle comprising an engine; a fuel injector for controlling a revolution speed of the engine; traveling means including a torque converter for traveling, which is driven by the engine; a variable displacement hydraulic pump driven by the engine; and working actuators driven by a hydraulic fluid delivered from the hydraulic pump, wherein the control system comprises pump torque control means for controlling an absorption torque of the hydraulic pump to be kept not exceeding a preset maximum absorption torque; input means for commanding a target revolution speed of the engine; state determining means for determining an operating state of the traveling working vehicle; and modification control means for modifying both a pump base torque to obtain the maximum absorption torque of the hydraulic pump and a target revolution speed of the engine depending on the determination result of the state determining means.

The state determining means determines the operating state of the traveling working vehicle, and the modification control means modifies both the pump base torque to obtain the maximum absorption torque of the hydraulic pump and the target revolution speed of the engine depending on the determination result of the state determining means. Therefore, even in the case using an ordinary engine in which an engine output characteristic cannot be changed, a load (absorption torque) of the hydraulic pump on the operating mechanism side can be reduced and an output on the travel driving side can be increased in heavy-load work. Further, the target engine revolution speed can be reduced to decrease fuel consumption. It is hence possible to ensure a work rate and to improve fuel economy.

Thus, according to the present invention, the engine output can be distributed to an output for traveling and an output for an operating mechanism in a well balanced manner based on the determination as to the operating state of the traveling working vehicle. In addition, since the engine load is reduced, fuel consumption can be reduced while ensuring the work rate in the heavy-load work.

Further, since the hydraulic pump on the operating mechanism side is of the variable displacement type, it is possible to control the pump capacity to any desired value and to obtain flexibility in the distribution of the engine output by changing the amount of modification of the maximum absorption torque.

(2) In above (1), preferably, the state determining means includes first determining means for determining a load state of the engine, and the modification control means performs modification to reduce each of the pump base torque to obtain the maximum absorption torque of the hydraulic pump and the target revolution speed of the engine when the first determining means determines the engine as being in an overload state.

In the heavy-load work, the engine is often brought into the overload state. By determining the engine load state as the operating state of the traveling working vehicle and by reducing each of the pump base torque to obtain the maximum absorption torque of the hydraulic pump and the target revolution speed when the engine is in the overload state, it is possible to ensure the work rate and to improve fuel economy at the same time in the heavy-load work.

(3) In above (1), preferably, the state determining means includes first determining means for determining a load state of the engine and second determining means for determining an operating situation of the traveling means, and the modification control means performs modification to reduce each of the pump base torque to obtain the maximum absorption torque of the hydraulic pump and the target revolution speed of the engine when the first determining means determines the engine as being in an overload state and the second determining means determines the traveling means as being in a state where the torque converter is nearly stalled.

In the heavy-load work, the engine is often brought into the overload state and the traveling means is often brought into the state where the torque converter is nearly stalled. By determining the engine load state and the operating situation of the traveling means as the operating state of the traveling working vehicle and by reducing each of the pump base torque to obtain the maximum absorption torque of the hydraulic pump and the target revolution speed when the engine is in the overload state and the traveling means is in the state where the torque converter is nearly stalled, it is possible to ensure the work rate and to improve fuel economy at the same time in the heavy-load work.

Further, by determining not only the engine load state, but also the operating situation of the traveling means as the operating state of the traveling working vehicle, whether the traveling working vehicle is under the heavy-load work or not can be more accurately determined.

(4) In above (1), preferably, the state determining means includes first determining means for determining a load state of the engine, second determining means for determining an operating situation of the traveling means, and third determining means for determining operating situations of the working actuators, and the modification control means performs modification to reduce each of the pump base torque to obtain the maximum absorption torque of the hydraulic pump and the target revolution speed of the engine when the first determining means determines the engine as being in an overload state, the second determining means determines the traveling means as being in a state where the torque converter is nearly stalled, and the third determining means determines the working actuators as being in a high load state.

In the heavy-load work, the engine is brought into the overload state, the traveling means is brought into the state where the torque converter is nearly stalled, and the working-actuators are brought into the high load state. By determining the engine load state, the operating situation of the traveling means and the operating situations of the working actuators as the operating state of the traveling working vehicle, and by reducing each of the pump base torque to obtain the maximum absorption torque of the hydraulic pump and the target revolution speed when the engine is in the overload state, the traveling means is in the state where the torque converter is nearly stalled, and the working actuators are in the high load state, it is possible to ensure the work rate and to improve fuel economy at the same time in the heavy-load work.

Further, by determining not only the engine load state, but also the operating situation of the traveling means and the operating situations of the working actuators as the operating state of the traveling working vehicle, whether the traveling working vehicle is under the heavy-load work or not can be more accurately determined.

(5) In any of above (2) to (4), preferably, the first determining means comprises means for detecting an actual revolution speed of the engine; and means for calculating a deviation between the target revolution speed and the actual revolution speed and determining the load state of the engine based on the revolution speed deviation.

(6) In above (3) or (4), preferably, the second determining means comprises means for detecting a revolution speed on the input side of the torque converter; means for detecting a revolution speed on the output side of the torque converter; and means for computing a torque converter speed ratio based on the revolution speed on the input side of the torque converter and the revolution speed on the output side of the torque converter and determining the operating situation of the traveling means based on the torque converter speed ratio.

(7) In above (4), preferably, the third determining means comprises means for detecting load pressure of the hydraulic pump; and means for determining the operating situations of the working actuators based on the load pressure of the hydraulic pump.

(8) In any one of above (2) to (4), preferably, the modification control means comprises means for computing a torque modification value and a revolution speed modification value when the first determining means determines the engine as being in an overload state, means for computing a difference between a reference maximum absorption torque and the torque modification value, thereby obtaining a modified maximum absorption torque, and means for computing a difference between the target revolution speed of the engine, which is commanded from the input means, and the revolution speed modification value, thereby obtaining a modified target revolution speed.

(9) In above (3) or (4), preferably, the modification control means comprises means for computing a first torque modification value and a first revolution speed modification value when the first determining means determines the engine as being in an overload state, means for computing a second torque modification value and a second revolution speed modification value when the second determining means determines the traveling means as being in a state where the torque converter is nearly stalled, means for executing arithmetic operation of the first torque modification value and the second torque modification value to decide a final torque modification value), means for executing arithmetic operation of the first revolution speed modification value and the second revolution speed modification value to decide a final revolution speed modification value, means for computing a difference between a reference maximum absorption torque and the final torque modification value, thereby obtaining a modified maximum absorption torque, and means for computing a difference between the target revolution speed of the engine, which is commanded from the input means, and the final revolution speed modification value, thereby obtaining a modified target revolution speed.

(10) In above (4), preferably, the modification control means comprises means for computing a first torque modification value and a first revolution speed modification value when the first determining means determines the engine as being in an overload state, means for computing a second torque modification value and a second revolution speed modification value when the second determining means determines the traveling means as being in a state where the torque converter is nearly stalled, means for computing a third torque modification value and a third revolution speed modification value when the third determining means determines the working actuators as being in a high load state, means for executing arithmetic operation of the first torque modification value, the second torque modification value and the third torque modification value to decide a final torque modification value, means for executing arithmetic operation of the first revolution speed modification value, the second revolution speed modification value and the third revolution speed modification value to decide a final revolution speed modification value, means for computing a difference between a reference maximum absorption torque and the final torque modification value, thereby obtaining a modified maximum absorption torque, and means for computing a difference between the target revolution speed of the engine, which is commanded from the input means, and the final revolution speed modification value, thereby obtaining a modified target revolution speed.

ADVANTAGES OF THE INVENTION

According to the present invention, the engine output can be distributed to the output for traveling and the output for the operating mechanism in a well balanced manner based on the determination as to the operating state of the traveling working vehicle. In addition, since the engine load is reduced, fuel consumption can be reduced while ensuring the work rate in the heavy-load work.

Further, since the hydraulic pump on the operating mechanism side is of the variable displacement type, it is possible to control the pump capacity to any desired value and to obtain flexibility in the distribution of the engine output by changing the amount of modification of the maximum absorption torque.

Figure 1:
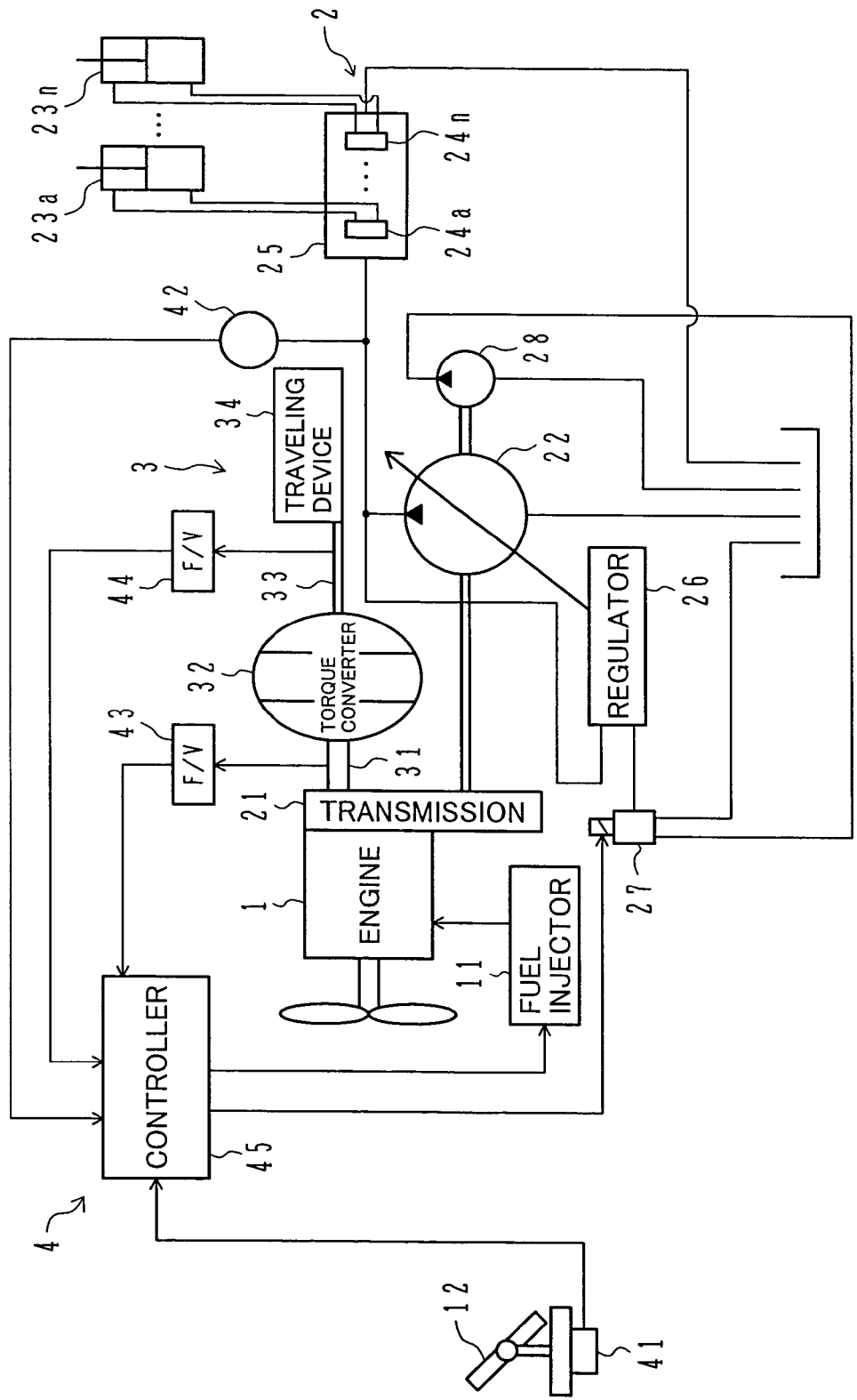
FIG. 1 is a block diagram showing an overall system including a control system for a traveling working vehicle according to one embodiment of the present invention.

| Reference Numerals | |
|---|---|
| 1 | engine |
| 2 | operating system |
| 3 | traveling system |
| 4 | control system |
| 11 | electric governor (fuel injector) |
| 12 | accelerator pedal |
| 21 | transmission |
| 22 | hydraulic pump |
| 23a . . . 23n | hydraulic actuators |
| 24a . . . 24n | direction control valves |
| 25 | valve unit |
| 26 | torque control regulator |
| 27 | torque control solenoid valve |
| 28 | pilot hydraulic pump |
| 31 | output shaft |
| 32 | torque converter |
| 33 | output shaft |
| 34 | traveling device |
| 41 | position sensor |
| 42 | pressure sensor |
| 43 | revolution sensor |
| 44 | revolution sensor |
| 45 | controller |
| 51 | base torque computing section |
| 52 | revolution speed deviation computing section |
| 53 | modification torque computing section |
| 54 | speed ratio computing section |
| 55 | traveling state determining section |
| 56 | working state determining section |
| 57 | selector |
| 58 | multiplier |
| 59 | adder |
| 61 | accelerator pedal angle target revolution speed computing section |
| 62 | revolution speed deviation computing section |
| 63 | modification revolution speed computing section |
| 64 | speed ratio computing section |
| 65 | traveling state determining section |
| 66 | working state determining section |
| 67 | selector |
| 68 | multiplier |
| 69 | adder |
| 100 | wheel loader |
| 101 | front body section |
| 102 | rear body section |
| 103 | steering cylinder |
| 104 | front operating mechanism |
| 105 | front wheel |
| 106 | cab |
| 107 | rear wheel |
| 111 | bucket |
| 112 | lift arm |
| 113 | bucket cylinder |
| 114 | arm cylinder |

BEST MODE FOR CARRYING OUT THE INVENTION

An embodiment of the present invention will be described below with reference to the drawings.

FIG. 1 is a block diagram showing an overall system including a control system for a traveling working vehicle according to one embodiment of the present invention.

In FIG. 1, the traveling working vehicle according to this embodiment includes a diesel engine (hereinafter referred to simply as an "engine") 1 serving as a prime mover, an operating system 2 and a traveling system 3 which are driven by the engine 1, and a control system 4.

The engine 1 includes an electronic governor (fuel injector) 11. The electronic governor 11 adjusts a fuel injection amount depending on an amount by which an accelerator pedal 12 is manipulated (i.e., an accelerator input), thereby controlling the revolution speed of the engine 1. The accelerator pedal 12 is manipulated by an operator and commands a target engine revolution speed (hereinafter referred to as a "target revolution speed") corresponding to the amount by which the accelerator pedal 12 is depressed (i.e., the accelerator input).

The operating system 2 comprises a hydraulic pump 22 connected to the engine 1 through a transmission 21 and driven by the engine 1, a plurality of hydraulic actuators (operating mechanism actuators) 23a . . . 23n operated by a hydraulic fluid which is delivered from the hydraulic pump 22, and a valve unit 25 including directional control valves 24a . . . 24n which are disposed between the hydraulic pump 22 and the hydraulic actuators 23a . . . 23n and which control respective flows of the hydraulic fluid supplied to the corresponding actuators. Not-shown control lever units are provided in association with the plurality of hydraulic actuators 23a . . . 23n. When the control lever units are manipulated, corresponding pilot pressures (operation input signals) are generated to shift the associated directional control valves 24a . . . 24n, thereby driving and controlling the hydraulic actuators 23a . . . 23n.

The hydraulic pump 22 is of the variable displacement type and includes a torque control regulator 26. When the delivery pressure of the hydraulic pump 22 rises beyond a certain value, the torque control regulator 26 reduces the tilting (displacement) of the hydraulic pump 22 in a responsive manner to execute control so that the absorption torque of the hydraulic pump 22 will not exceed a setting value (maximum pump absorption torque). The setting value (maximum pump absorption torque) of the torque control regulator 26 is variable and controlled by a torque control solenoid valve 27. The torque control solenoid valve 27 is operated in accordance with an electrical command signal and outputs control pressure corresponding to the command signal while using, as a hydraulic pressure source, the delivery pressure of a pilot hydraulic pump 28 which is also driven by the engine 1.

The traveling system 3 comprises a torque converter 32 coupled to an output shaft 31 of the engine 1, and a traveling device 34 coupled to an output shaft 33 of the torque converter 32. The traveling device 34 includes a transmission, a differential gear, axles, front wheels, rear wheels, etc. Motive power of the output shaft 33 is transmitted to the rear wheels through the transmission, the differential gear, the axle, etc., thereby generating a traveling force.

The control system 4 comprises a position sensor 41 for detecting the amount by which the accelerator pedal 12 is depressed (i.e., the accelerator input), a pressure sensor 42 for detecting the delivery pressure of the hydraulic pump 22 which represents the operating situations of the hydraulic actuators 23a . . . 23n, a revolution sensor 43 for detecting the input revolution speed of the torque converter 32 (i.e., the revolution speed of the output shaft 31) which represents the output revolution speed of the engine 1 (actual revolution speed), a revolution sensor 44 for detecting the output revolution speed of the torque converter 32 (i.e., the revolution speed of the output shaft 33), and a controller 45. The controller 45 receives signals from the position sensor 41, the pressure sensor 42, and the revolution sensors 43 and 44. After executing predetermined arithmetic and logical operations, the controller 45 outputs command signals to the electronic governor 11 and the torque control solenoid valve 27, thereby controlling the output and revolution speed of the engine 1 and the maximum absorption torque of the hydraulic pump 22.

Figure 2:
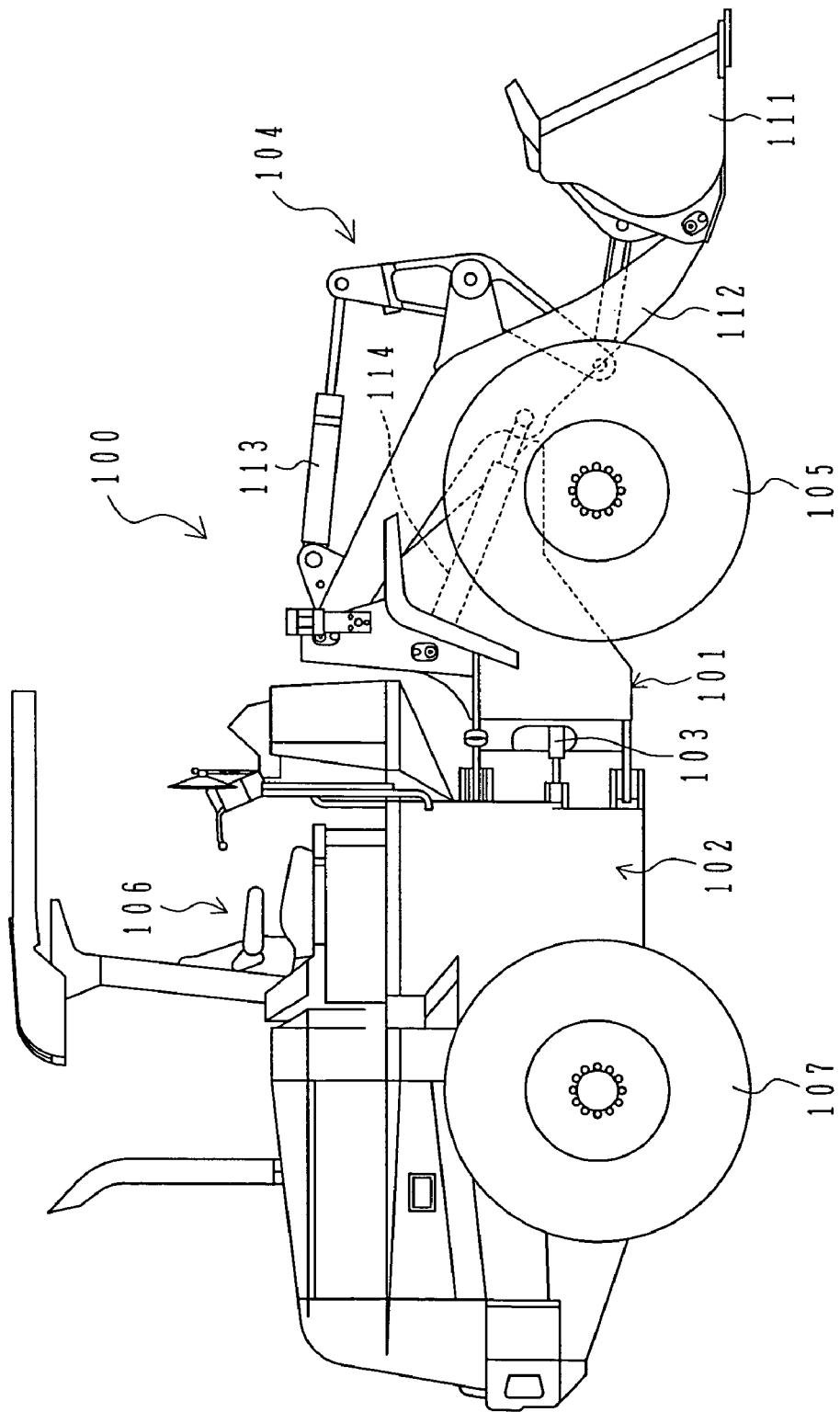
FIG. 2 is an external appearance view of a wheel loader as one example of the traveling working vehicle in which is mounted the overall system shown in FIG. 1.

FIG. 2 is an external appearance view of a wheel loader as one example of the traveling working vehicle in which is mounted the overall system shown in FIG. 1.

In FIG. 2, numeral 100 denotes the wheel loader. The wheel loader 100 comprises a front body section 101 and a rear body section 102. The front body section 101 and the rear body section 102 are relatively rotatably coupled to each other through a steering cylinder 103 such that the direction of the front body section 101 is variable relative to the rear body section 102. A front operating mechanism 104 and front wheels 105 are mounted to the front body section 101, while a cab 106 and rear wheels 107 are mounted to the rear body section 102. The front operating mechanism 104 is made up of a bucket 111 and a lift arm 112. The bucket 111 performs the tilting/dumping operation with extension/contraction of a bucket cylinder 113, and the lift arm 112 is operated up and down with extension/contraction of an arm cylinder 114. In the following description, the front operating mechanism 104 is referred to simply as the "operating mechanism" as required.

Returning to FIG. 1, the hydraulic actuators 23a . . . 23n are constituted by the steering cylinder 103, the bucket cylinder 113, the arm cylinder 114, etc. The traveling device 34 drives the rear wheels 106. The accelerator pedal 12 and the not-shown control lever units are disposed on a floor of the cab 106. Main units of equipment, such as the engine 1, the hydraulic pump 22 and the controller 45, are mounted on the rear body section 102.

Figure 3:
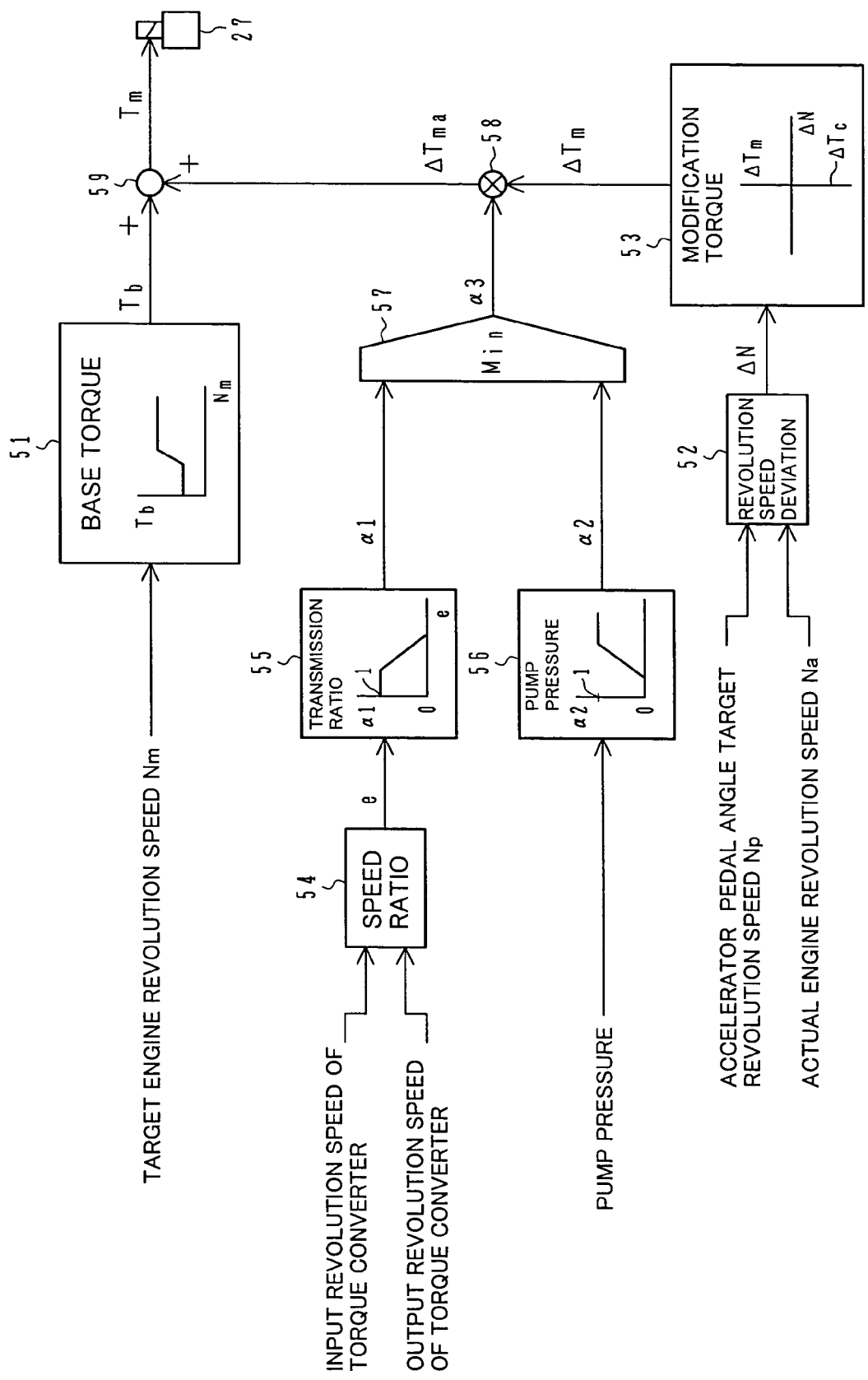
FIG. 3 is a functional block diagram showing processing functions related to pump control of a controller.

FIG. 3 is a functional block diagram showing processing functions related to pump control of the controller 45.

In FIG. 3, the controller 45 has functions executed by a base torque computing section 51, a revolution speed deviation computing section 52, a modification torque computing section 53, a speed ratio computing section 54, a traveling state determining section 55, a working state determining section 56, a selector 57, a multiplier 58, and an adder 59.

The base torque computing section 51 receives a target engine revolution speed Nm and computes a pump base torque Tb corresponding to the target engine revolution speed Nm at that time by referring to a table stored in a memory based on the received speed. The table stored in the memory sets the relationship between Nm and Tb such that as the target engine revolution speed Nm increases, the pump base torque Tb is also increased, and when the target engine revolution speed Nm exceeds a certain value, the pump base torque is held at a maximum constant value. The target engine revolution speed Nm is an engine revolution speed modified by the engine control function of the controller 45 (as described later).

The revolution speed deviation computing section 52 computes an engine revolution speed deviation $\Delta N$ (=Na−Np) by subtracting an accelerator pedal angle target revolution speed Np from an actual engine revolution speed Na detected by the revolution sensor 43. The accelerator pedal angle target revolution speed Np is a target revolution speed set depending on the amount by which the accelerator pedal 12 is depressed (i.e., the accelerator angle) (as described later).

The modification torque computing section 53 receives the revolution speed deviation ΔN computed in the revolution speed deviation computing section 52 and computes a modification torque ΔTm corresponding to the revolution speed deviation ΔN at that time by referring to a table stored in a memory based on the received deviation. The modification torque ΔTm is used to reduce the maximum absorption torque of the hydraulic pump 22 when the wheel loader is in a state operated under such a high load that the hydraulic pump 22 consumes the maximum absorption torque and the sum of the pump absorption torque (working load) and the input torque (traveling torque) of the torque converter 32 exceeds the output torque of the engine 1. The table stored in the memory sets the relationship between ΔN and ΔTm as follows. When the actual engine revolution speed Na is matched with the target engine revolution speed Np and the revolution speed deviation ΔN is 0, ΔTm=0 is given. When the actual engine revolution speed Na is reduced and the revolution speed deviation ΔN becomes a negative value, ΔTm=ΔTc (<0) is given.

The speed ratio computing section 54 receives detected signals from the revolution speed sensors 43 and 44, which represent the input and output revolution speeds of the torque converter 32, and it computes e=output revolution speed/input revolution speed, thereby obtaining a torque converter speed ratio e.

The traveling state determining section 55 receives the torque converter speed ratio e computed in the speed ratio computing section 54 and computes a first determination coefficient α1 corresponding to the torque converter speed ratio e at that time by referring to a table stored in a memory based on the received ratio. The first determination coefficient α1 is used to perform modification of the pump absorption torque (i.e., reduction of the pump maximum absorption torque) with the modification torque ΔTm when the torque converter speed ratio e is small (when the torque converter 32 is in a nearly stalled state), namely when the wheel loader is in an operating condition where the traveling system 3 requires a large traveling force (traveling torque). The table stored in the memory sets the relationship between e and α1 as follows. When the torque converter speed ratio e is smaller than a first setting value, α1=1 is given, and when the torque converter speed ratio e is not smaller than a second setting value (>first setting value), α1=0 is given. When the torque converter speed ratio e is between the first setting value and the second setting value, α1 is reduced at a predetermined rate (gain) as the torque converter speed ratio e increases.

The working state determining section 56 receives a detected signal from the pressure sensor 42, which represents the pump pressure, and it computes a second determination coefficient α2 corresponding to the pump pressure at that time by referring to a table stored in a memory based on the received signal. The second determination coefficient α2 is used to perform modification of the pump absorption torque (i.e., control to reduce the pump maximum absorption torque) with the modification torque ΔTm when the delivery pressure of the hydraulic pump 22 is high (when the working load is large), namely when the operating system 2 is in an operating condition where heavy-load work is performed. The table stored in the memory sets the relationship between the pump pressure and α2 as follows. When the pump pressure is lower than a first setting value, α2=0 is given, and when the pump pressure is not lower than a second setting value (>first setting value), α2=1 is given. When the pump pressure is between the first setting value and the second setting value, α2 is increased at a predetermined rate (gain) as the pump pressure rises.

The selector 57 selects a smaller value of the first determination coefficient α1 and the second determination coefficient α2 and sets the selected value as a third determination coefficient α3. When the first determination coefficient al and the second determination coefficient α2 are equal to each other, the selector 57 selects one of those two coefficients, e.g., α1, in accordance with the preset logic.

The multiplier 58 multiplies the modification torque ΔTm computed in the modification torque computing section 53 by the third determination coefficient α3 outputted from the selector 57, thereby obtaining a modification torque ΔTma.

The adder 59 adds the modification torque ΔTma (negative value) to the pump base torque Tb computed in the base torque computing section 51, thereby computing a modified pump base torque Tm. The modified pump base torque Tm is converted to a command signal for the torque control solenoid valve 27 by a known method, and the command signal is outputted to the torque control solenoid valve 27. Responsively, the torque control solenoid valve 27 outputs, to the torque control regulator 26, control pressure corresponding to the command signal for such adjustment that the maximum pump absorption torque set in the torque control regulator 26 becomes Tm.

Figure 4:
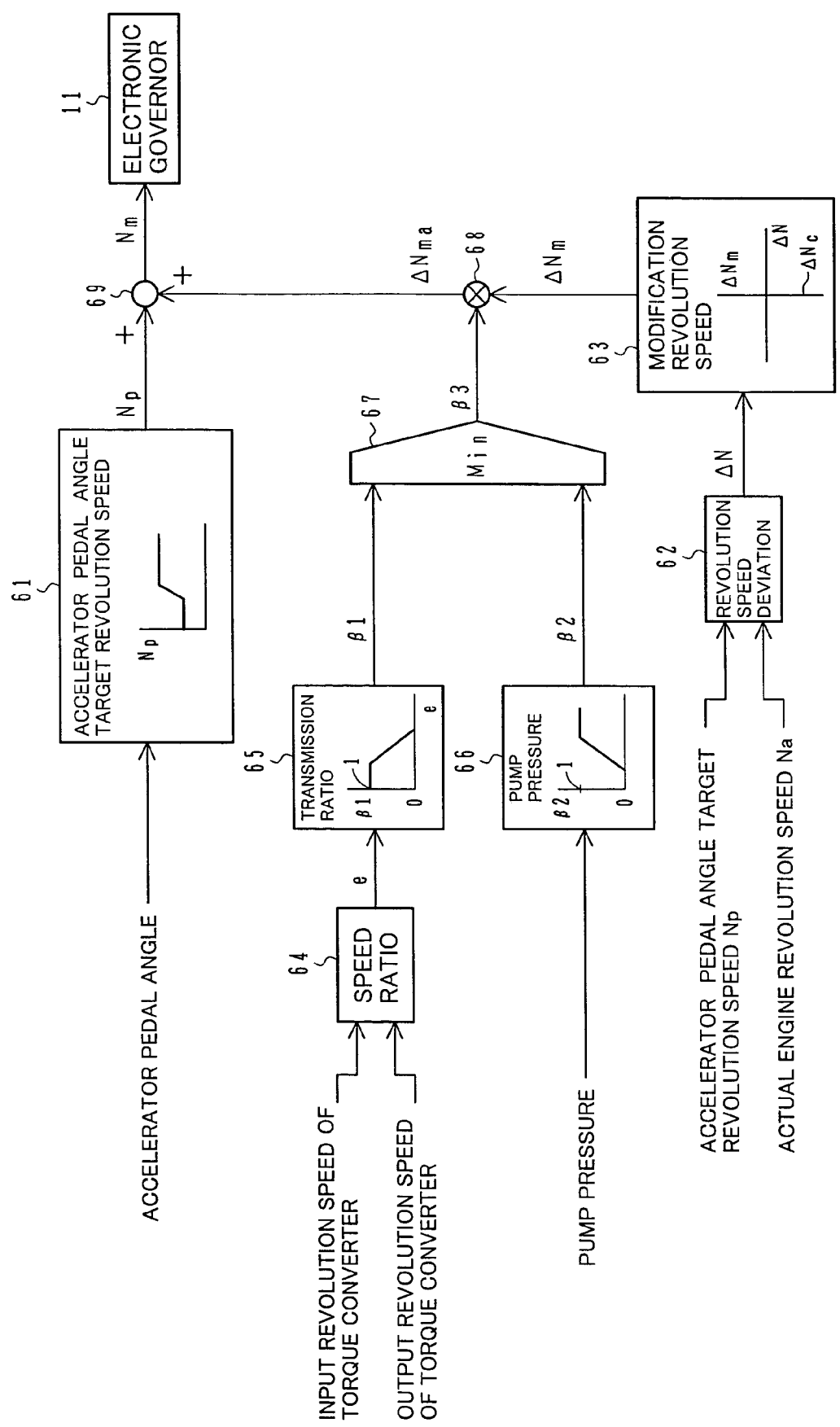
FIG. 4 is a functional block diagram showing processing functions related to engine control of the controller.

FIG. 4 is a functional block diagram showing processing functions related to engine control of the controller 45.

In FIG. 4, the controller 45 has functions executed by an accelerator pedal angle target revolution speed computing section 61, a revolution speed deviation computing section 62, a modification revolution speed computing section 63, a speed ratio computing section 64, a traveling state determining section 65, a working state determining section 66, a selector 67, a multiplier 68, and an adder 69.

The accelerator pedal angle target revolution speed computing section 61 receives a detected signal from the position sensor 41, which represents the accelerator pedal angle, and it computes a target engine revolution speed (accelerator pedal angle target revolution speed) Np corresponding to the accelerator pedal angle at that time by referring to a table stored in a memory based on the received signal. The target revolution speed Np is an engine revolution speed intended by the operator during work. The table stored in the memory sets the relationship between the accelerator pedal angle and the target revolution speed Np such that as the accelerator pedal angle increases, the target revolution speed Np is also increased.

The revolution speed deviation computing section 62 has similar function to that of the revolution speed deviation computing section 52 shown in FIG. 3, and it computes an engine revolution speed deviation ΔN (=Na−Np) by subtracting the accelerator pedal angle target revolution speed Np from the actual engine revolution speed Na detected by the revolution sensor 43.

The modification revolution speed computing section 63 receives the revolution speed deviation ΔN computed in the revolution speed deviation computing section 62 and computes a modification revolution speed ΔNm corresponding to the revolution speed deviation ΔN at that time by referring to a table stored in a memory based on the received deviation. The modification revolution speed ΔNm is used to reduce the target revolution speed of the engine 1 when the wheel loader is in a state operated i under such a high load that the hydraulic pump 22 consumes the maximum absorption torque and the sum of the pump absorption torque (working load) and the input torque (traveling torque) of the torque converter 32 exceeds the output torque of the engine 1. The table stored in the memory sets the relationship between ΔN and ΔNm as follows. When the actual engine revolution speed Na is matched with the target engine revolution speed Np and the revolution speed deviation ΔN is 0, ΔNm=0 is given. When the actual engine revolution speed Na is reduced and the revolution speed deviation ΔN becomes a negative value, ΔNm=ΔNc (<0) is given.

The speed ratio computing section 64, the traveling state determining section 65, the working state determining section 66, and the selector 67 have similar functions to those of the speed ratio computing section 54, the traveling state determining section 55, the working state determining section 56, and the selector 57 shown in FIG. 3, and they compute a torque converter speed ratio e, a first determination coefficient β1, and a second determination coefficient β2, and a third determination coefficient β3, respectively.

The first determination coefficient β1 is used to perform modification of the target engine revolution speed (i.e., control to reduce the target engine revolution speed) with the modification revolution speed ΔNm when the torque converter speed ratio e is small (when the torque converter 32 is in a nearly stalled state), namely when the wheel loader is in an operating condition where the traveling system 3 requires a large traveling force (traveling torque). Similarly to the relationship between the torque converter speed ratio e and α1, the table stored in the memory sets the relationship between e and β1 as follows. When the torque converter speed ratio e is smaller than a first setting value, β1=1 is given, and when the torque converter speed ratio e is not smaller than a second setting value (>first setting value), β1=0 is given. When the torque converter speed ratio e is between the first setting value and the second setting value, β1 is reduced at a predetermined rate (gain) as the torque converter speed ratio e increases.

The second determination coefficient β2 is used to perform modification of the target engine revolution speed (i.e., control to reduce the target engine revolution speed) with the modification revolution speed ΔNm when the delivery pressure of the hydraulic pump 22 is high (when the working load is large), namely when the operating system 2 is in an operating condition where heavy-load work is performed. Similarly to the relationship between the pump pressure and α2, the table stored in the memory sets the relationship between the pump pressure and β2 as follows. When the pump pressure is lower than a first setting value, β2=0 is given, and when the pump pressure is not lower than a second setting value (>first setting value), β2=1 is given. When the pump pressure is between the first setting value and the second setting value, β2 is increased at a predetermined rate (gain) as the pump pressure rises.

The multiplier 68 multiplies the modification revolution speed ΔNm computed in the modification revolution speed computing section 63 by the third determination coefficient β3 outputted from the selector 67, thereby obtaining a modification revolution speed ΔNma.

The adder 69 adds the modification revolution speed ΔNma (negative value) to the accelerator pedal angle target revolution speed Np computed in the target revolution speed computing section 61, thereby computing a modified target revolution speed Nm. The modified target revolution speed Nm is converted to a target fuel injection amount by a known method, and a resulting command signal is outputted to the electronic governor 11. Responsively, the electronic governor 11 injects fuel in accordance with the command signal to execute control such that the engine revolution speed becomes Nm.

In the foregoing arrangement, the torque control regulator 26 constitutes pump torque control means for controlling the absorption torque of the hydraulic pump 22 to be kept not exceeding a preset maximum absorption torque. The accelerator pedal 12 constitutes input means for commanding a target revolution speed of the engine 1. The revolution speed deviation computing sections 52 and 62, the modification torque computing section 53, the modification revolution speed computing section 63, the speed ratio computing sections 54 and 64, the traveling state determining sections 55 and 65, and the working state determining sections 56 and 66 constitute state determining means for determining the operating state of the traveling working vehicle. The modification torque computing section 53, the modification revolution speed computing section 63, the selectors 57 and 67, the multipliers 58 and 68, and the adders 59 and 69 constitute modification control means for modifying both the pump base torque to obtain the maximum absorption torque of the hydraulic pump 22 and the target revolution speed of the engine 1 depending on the determination result of the state determining means. The modification torque computing section 53 and the modification revolution speed computing section 63 serve as the state determining means and the modification control means.

Further, the revolution speed deviation computing sections 52 and 62, the modification torque computing section 53, and the modification revolution speed computing section 63 constitute first determining means for determining the load state of the engine 1. The speed ratio computing sections 54 and 64, and the traveling state determining sections 55 and 65 constitute second determining means for determining the operating situation of the traveling device 34 (traveling means). The traveling state determining sections 55 and 65 constitute third determining means for determining the operating situations of the hydraulic actuators (working actuators) 23a ... 23n. The modification control means (constituted by the modification torque computing section 53, the modification revolution speed computing section 63, the selectors 57 and 67, the multipliers 58 and 68, and the adders 59 and 69) performs modification to reduce each of the pump base torque to obtain the maximum absorption torque of the hydraulic pump 22 and the target revolution speed of the engine 1 when the first determining means determines the engine 1 as being in an overload state, the second determining means determines the traveling means 34 as being in a state where the torque converter is nearly stalled, and the third determining means determines the working actuators 23a ... 23n as being in a high load state.

The operation of this embodiment will be described below.

Figure 5:
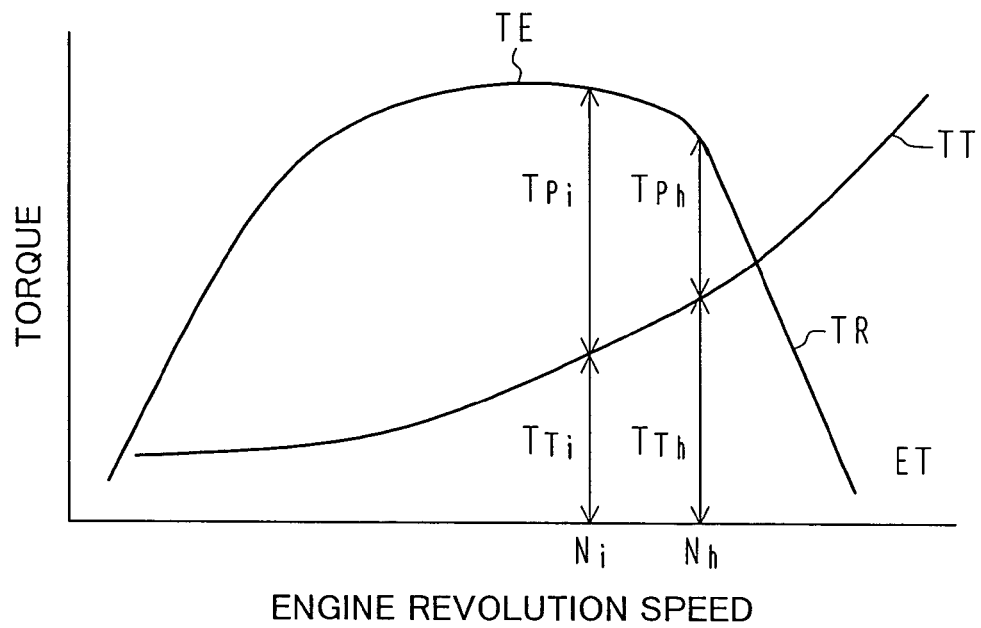
FIG. 5 is a graph showing changes of a pump absorption torque, a torque converter torque, and an engine revolution speed when an operating mechanism force is increased, the graph representing a known system.
Figure 6:
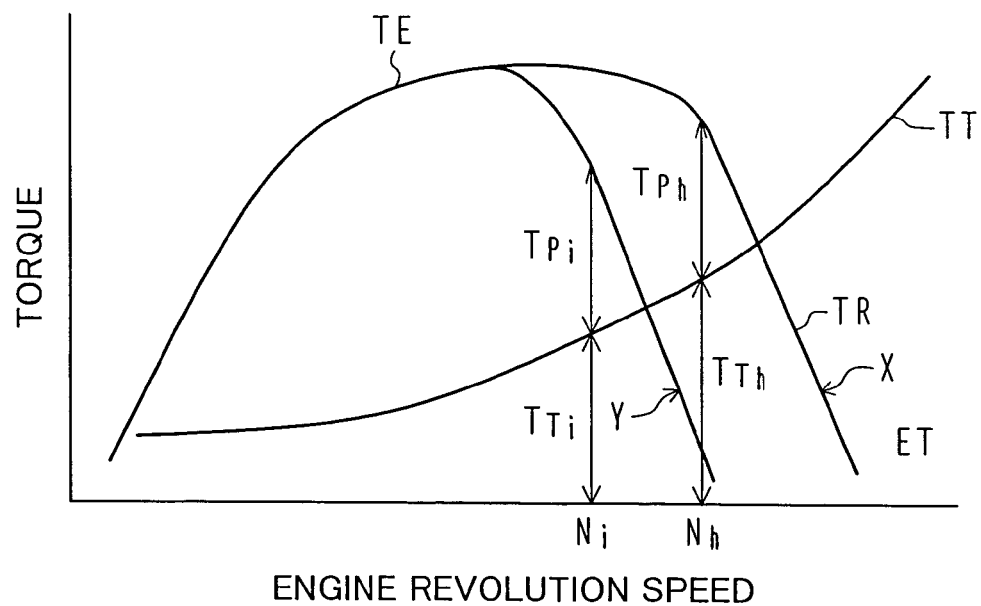
FIG. 6 is a graph showing changes of the pump absorption torque, the torque converter torque, and the engine revolution speed when the operating mechanism force is increased, the graph representing the system of the present invention.

FIGS. 5 and 6 are each a graph showing changes of the pump absorption torque, the torque converter torque, and the engine revolution speed when an operating mechanism force (i.e., the load pressure of the hydraulic pump 22) is increased. FIG. 5 represents a known system and FIG. 6 represents the system of the present invention. In each graph, the horizontal axis indicates the revolution speed of the engine 1, and the vertical axis indicates torque. Also, TE is a characteristic line representing the output torque of the engine 1 (hereinafter referred to as the "engine torque" as required) in a full load region where the fuel injection amount of the electronic governor 11 is maximized. TR is a characteristic line representing the output torque of the engine 1 (hereinafter referred to as the "engine torque" as required) in a regulation region (i.e., a control region of the fuel injection amount) before the fuel injection amount of the electronic governor 11 is maximized. TT is a characteristic line representing the input torque of the torque converter 32 (i.e., the torque converter torque). The plotted torque-converter torque characteristic line TT is assumed to represent one obtained when the torque converter 32 is in the nearly stalled state (i.e., when the output revolution speed is close to 0 and the speed ratio e≈0 is established).

Let suppose, as exemplary work of the traveling working vehicle (wheel loader), work that is performed by manipulating the accelerator pedal 12 through a full stroke and that is performed by using both the traveling tractive force and the operating mechanism force. One example of such work is excavation of natural ground. In the work excavating the natural ground, the bucket is first pushed into the natural ground by the traveling tractive force. Then, the bucket is lifted upward. When the bucket is fully lifted upward, the wheel loader is traveled to another place where earth in the bucked is dumped. In a second half of the work of pushing the bucket into the natural ground by the traveling tractive force, that work is performed by utilizing not only the traveling tractive force, but also the operating mechanism force in many cases. Also, a first half of the subsequent work of lifting the bucket upward by the operating mechanism force is performed while pushing the bucket into the natural ground in many cases. In the following description, the former work (i.e., the work of pushing the bucket by utilizing both the traveling tractive force and the operating mechanism force) is called heavy-load work 1, and the latter work (i.e., the work of lifting the bucket upward by utilizing the operating mechanism force while pushing the bucket into the natural ground) is called heavy-load work 2.

In the past, when the accelerator pedal 12 is fully manipulated, the accelerator pedal angle target revolution speed Np is always set to a maximum target revolution speed Nmax. Also, even when the output revolution speed (actual revolution speed) of the engine 1 is reduced, the maximum absorption torque Tmax of the hydraulic pump 22 is held constant. Consequently, as shown in FIG. 5, the pump absorption torque, the torque converter torque, and the engine revolution speed are changed in the heavy-load work 1 and the heavy-load work 2 as summarized below.

<Heavy-Load Work 1>
Engine revolution speed (actual revolution speed)= Nh≈Nmax
Pump torque Tph
Torque converter torque (traveling tractive force) TTh <Heavy-Load Work 2>
Pump torque Tph→increased to Tpi=Tpmax
Torque converter torque (traveling tractive force) TTh→decreased to TTi
Engine revolution speed (actual revolution speed)= Nh≈Nmax→decreased to Ni In contrast, according to this embodiment, the maximum absorption torque and the target engine revolution speed are variable as shown in FIGS. 3 and 4. Consequently, as shown in FIG. 6, the pump absorption torque, the torque converter torque, and the engine revolution speed are changed in the heavy-load work 1 and the heavy-load work 2 as summarized below.

<Heavy-Load Work 1>
Engine revolution speed (actual revolution speed)= Nh≈Nmax
Target engine revolution speed Nm=accelerator pedal angle target revolution speed Np (=Nmax)
Pump torque Tph
Torque converter torque (traveling tractive force) TTh <Heavy-Load Work 2>
Pump torque Tph→Tpi≈Tph (hardly changed)
Torque converter torque (traveling tractive force) TTh→decreased to TTi Engine revolution speed (actual revolution speed)= Nh≈Nmax→decreased to Ni
Target engine revolution speed Nm=Np (Nmax)→decreased to Ni
The state change from the heavy-load work 1 to the heavy-load work 2 in this embodiment will be described in more detail below with reference to FIGS. 6, 3 and 4.

<Heavy-Load Work 1>
In the heavy-load work 1, the absorption torque Tph of the hydraulic pump 22 is smaller than the pump maximum absorption torque Tmax, and the sum of the pump absorption torque Tph (working load) and the torque converter torque TTh, i.e., the input torque of the torque converter 32, is substantially in balance with the output torque of the engine 1. In this case, the engine revolution speed deviation ΔN (=Na−Np) computed in the revolution speed deviation computing section 52, shown in FIG. 3, is substantially 0 and the modification torque ΔTm computed in the modification torque computing section 53 is also substantially 0. In the adder 59, therefore, the pump base torque Tb computed in the base torque computing section 51 is computed as the modified pump base torque Tm as it is, and the pump maximum absorption torque Tmax (=Tm) is not changed. Similarly, the revolution speed deviation ΔN (=Na−Np) computed in the revolution speed deviation computing section 62, shown in FIG. 4, is substantially 0 and the modification revolution speed ΔNm computed in the modification revolution speed computing section 63 is also substantially 0. In the adder 69, therefore, the accelerator pedal angle target revolution speed Np computed in the accelerator pedal angle target revolution speed computing section 61 is computed as the modified target revolution speed Nm as it is, and the target engine revolution speed Nm (Nmax) is also not changed. In this case, the engine revolution speed is maintained at Nh (≈Nmax).

<Heavy-Load Work 2>
When the situation shifts from the above state to the heavy-load work 2 in which the hydraulic pump 22 consumes the maximum absorption torque Tmax and the sum of the pump absorption torque and the torque converter torque exceeds the output torque of the engine 1, the modification torque ΔTm and the modification revolution speed ΔNm are computed respectively in the modification torque computing section 53 and the modification revolution speed computing sections 63 shown in FIGS. 3 and 4. Also, in this case, because the torque converter 32 is in the nearly stalled state and the delivery pressure of the hydraulic pump 22 is at a high level close to the relief pressure of a main relief valve (not shown), the torque converter speed ratio e computed in each of the speed ratio computing sections 54 and 64, shown in FIGS. 3 and 4, are each substantially 0, the first determination coefficients α1 and β1 computed in the-traveling state determining sections 55 and 65 are each substantially 1, and the second determination coefficients α2 and β2 computed in the working state determining sections 56 and 66 are each also substantially 1. Therefore, the third determination coefficients α3 and β3 outputted from the selectors 57 and 67, shown in FIGS. 3 and 4, are each substantially 1. Correspondingly, the multipliers 58 and 68 output the modification torque ΔTm and the modification revolution speed ΔNm, as they are, as the modification torque ΔTma and the modification revolution speed ΔNma. The adder 59 computes, as the modified pump base torque Tm, a value obtained by adding the modification torque ΔTm to the pump base torque Tb, and the adder 69 computes, as the modified target revolution speed Nm, a value obtained by adding the modification revolution speed ΔNm to the accelerator pedal angle target revolution speed Np. As a result, the maximum absorption torque of the hydraulic pump 22 is reduced from Tb to (Tb+ΔTm), and the target revolution speed of the engine 1 is reduced from Np to (Np+ΔNm). Accordingly, the characteristic line (TE+TR) of the engine 1 is changed from X to Y as shown in FIG. 6. In other words, the maximum absorption torque Tph of the hydraulic pump 22 is not increased and is changed to Tpi comparable to Tph unlike the case of FIG. 5, and the input torque of the torque converter 32 (i.e., the torque converter torque) is reduced from TTh to TTi. Hence the sum of the pump absorption torque Tpi and the torque converter torque TTi is balanced with the output torque of the engine 1 on the characteristic line TR in the regulation region, and the engine revolution speed is reduced from Nh to Ni as in the known case.

Consequently, this embodiment can provide the following operational advantages.

<Operation 1>

In the heavy-load work 2, the torque converter torque (traveling tractive force) is reduced from TTh to TTi. This point is the same as in the known case. On the other hand, the pump torque becomes Tpi≈Tph that is smaller than Tpi in the known case, and therefore the delivery rate of the hydraulic pump 22 becomes smaller than that in the known case. In the heavy-load work 2, the delivery pressure of the hydraulic pump 22 rises, but the movement of the front operating mechanism 104 is slow in many cases. Thus, the work rate is not dropped in comparison with the known case.

<Operation 2>

The pump torque becomes Tpi≈Tph that is smaller than Tpi in the known case. The torque converter torque (traveling tractive force) is reduced from TTh to TTi. As a result, the engine load (Tpi+TTi) is reduced from that in the known case. Hence the target revolution speed Nm is reduced from Np (Nmax) to Ni. With the reduction in both the engine load and the target revolution speed, fuel economy is improved.

Accordingly, with this embodiment, the engine output can be distributed to the output for traveling and the output for the operating mechanism in a well balanced manner based on the determination as to the operating state of the traveling working vehicle. In addition, since the engine load is reduced, fuel consumption can be reduced while ensuring the work rate in the heavy-load work.

Further, in the traveling state determining section 55, the relationship between e and α1 is set such that when the torque converter speed ratio e is between the first setting value and the second setting value, α1 is reduced at a predetermined rate (gain) as the torque converter speed ratio e increases. In the working state determining section 56, the relationship between the pump pressure and α2 is set such that when the pump pressure is between the first setting value and the second setting value, α2 is increased at a predetermined rate (gain) as the pump pressure rises. The hydraulic pump 22 on the operating mechanism side is of the variable displacement type. Therefore, when the torque converter speed ratio e is between the first setting value and the second setting value, or when the pump pressure is between the first setting value and the second setting value, the magnitude of the modification torque ΔTm is modified corresponding to the magnitude of the torque converter speed ratio or the pump pressure, whereby the amount of modification of the maximum absorption torque of the hydraulic pump 22 can be changed depending on the operating situation of the traveling device 34 or the operating situations of the working actuators 23a . . . 23n. Thus, by changing the amount of modification of the maximum absorption torque, it is possible to control the pump capacity to any desired value and to obtain flexibility in output distribution of the engine 1.

Moreover, with this embodiment, in the traveling state determining section 65, the relationship between e and β1 is set such that when the torque converter speed ratio e is between the first setting value and the second setting value, β1 is reduced at a predetermined rate (gain) as the torque converter speed ratio e increases. In the working state determining section 66, the relationship between the pump pressure and β2 is set such that when the pump pressure is between the first setting value and the second setting value, β2 is increased at a predetermined rate (gain) as the pump pressure rises. Therefore, when the torque converter speed ratio e is between the first setting value and the second setting value, or when the pump pressure is between the first setting value and the second setting value, the magnitude of the modification revolution speed ΔNm is modified corresponding to the magnitude of the torque converter speed ratio or the pump pressure, whereby the amount of modification of the target engine revolution speed can be changed depending on the operating situation of the traveling device 34 or the operating situations of the working actuators 23a . . . 23n. Thus, by changing the amount of modification of the target engine revolution speed, it is possible to give higher flexibility in output distribution of the engine 1.

Note that the above-described embodiment can be modified in various ways within the scope of the gist of the present invention. For example, while the embodiment is described above in connection with the wheel loader as the traveling working vehicle, similar advantages can also be obtained even when the present invention is applied to any other type of traveling hydraulic working machine so long as it includes a torque converter. Examples of the traveling working vehicle including a torque converter, other than the wheel loader, are a telescopic handler and a wheel shovel.

While the revolution speed deviation computing sections 52 and 62, the speed ratio computing sections 54 and 64, the traveling state determining sections 55 and 65, and the working state determining sections 56 and 66, and the selectors 57 and 67 are separately disposed in the pump control section (FIG. 3) and the engine control section (FIG. 4) of the controller 4, respectively, those sections may be disposed in one set to be shared by the pump control section and the engine control section.

While the pump base torque Tb and the accelerator pedal angle target revolution speed Np are modified by a method comprising the steps of computing the modification torque ΔTm, the modification revolution speed ΔNm, and the third determination coefficients α3 and β3, multiplying ΔTm and ΔNm by α3 and β3, and adding the multiplied values to the pump base torque Tb and the accelerator pedal angle target revolution speed Np, respectively, any other suitable method is also usable so long as similar results are obtained. The other suitable method comprises, for example, the steps of providing outputs of the selectors 57 and 67 as the modification torque and the modification revolution speed, respectively, and calculating modification coefficients in the computing sections 53 and 63, or the steps of outputting the modification torques and the modification revolution speeds from both the selectors and those computing sections and adding the respective outputs, or the steps of outputting modification coefficients from both the selectors and those computing sections and multiplying the pump base torque Tb and the accelerator pedal angle target revolution speed Np by the respective modification coefficients.

While the operating situation of the working actuator is determined by detecting the delivery pressure of the hydraulic pump 22, a control signal from not-shown means for manipulating the operating mechanism may be detected instead of or in combination with the delivery pressure of the hydraulic pump 22. In that case, the operating situation of the working actuator can be more accurately confirmed.

The invention claimed is:

1. A control system for a traveling working vehicle comprising:
an engine;
a fuel injector for controlling a revolution speed of said engine;
traveling means including a torque converter for traveling, which is driven by said engine;
a variable displacement hydraulic pump driven by said engine; and
working actuators driven by a hydraulic fluid delivered from said hydraulic pump,
wherein said control system comprises;
pump torque control means for controlling an absorption torque of said hydraulic pump to be kept not exceeding a preset maximum absorption torque (Tm);
input means for commanding a target revolution speed (Np) of said engine;
state determining means for determining an operating state of said traveling working vehicle;
modification control means for modifying both a pump base torque (Tb) to obtain the maximum absorption torque (Tm) of said hydraulic pump and a target revolution speed (Np) of said engine depending on the determination result of said state determining means;
wherein said state determining means includes first determining means for determining a load state of said engine, and
said modification control means performs modification to reduce each of the pump base torque (Tb) to obtain the maximum absorption torque (Tm) of said hydraulic pump and the target revolution speed (Np) of said engine when said first determining means determines said engine as being in an overload state.

2. The control system for the traveling working vehicle according to claim 1,
wherein said first determining means comprises:
means for detecting an actual revolution speed (Na) of said engine; and
means for calculating a deviation (ΔN) between the target revolution speed (Np) and the actual revolution speed (Na) and determining the load state of said engine based on the revolution speed deviation.

3. The control system for the traveling working vehicle according to claim 1,
wherein said modification control means comprises means for computing a torque modification value (ΔTm) and a revolution speed modification value (ΔNm) when said first determining means determines said engine as being in an overload state, means for computing a difference between a reference maximum absorption torque (Tb) and the torque modification value (ΔTm), thereby obtaining a modified maximum absorption torque (Tm), and means for computing a difference between the target revolution speed (Np) of said engine, which is commanded from said input means, and the revolution speed modification value (ΔNm), thereby obtaining a modified target revolution speed (Nm).

4. A control system for a traveling working vehicle comprising:
an engine;
a fuel injector for controlling a revolution speed of said engine;
traveling means including a torque converter for traveling, which is driven by said engine;
a variable displacement hydraulic pump driven by said engine; and
working actuators driven by a hydraulic fluid delivered from said hydraulic pump,
wherein said control system comprises:
pump torque control means for controlling an absorption torque of said hydraulic pump to be kept not exceeding a preset maximum absorption torque (Tm);
input means for commanding a target revolution speed (Np) of said engine;
state determining means for determining an operating state of said traveling working vehicle;
modification control means for modifying both a pump base torque (Tb) to obtain the maximum absorption torque (Tm) of said hydraulic pump and a target revolution speed (Np) of said engine depending on the determination result of said state determining means;
wherein said state determining means includes first determining means for determining a load state of said engine and second determining means for determining an operating situation of said traveling means, and
said modification control means performs modification to reduce each of the pump base torque (Tb) to obtain the maximum absorption torque (Tm) of said hydraulic pump and the target revolution speed (Np) of said engine when said first determining means determines said engine as being in an overload state and said second determining means determines said traveling means as being in a state where said torque converter is nearly stalled.

5. The control system for the traveling working vehicle according to claim 4,
wherein said second determining means comprises:
means for detecting a revolution speed (Na) on the input side of said torque converter;
means for detecting a revolution speed on the output side of said torque converter; and
means for computing a torque converter speed ratio (e) based on the revolution speed on the input side of said torque converter and the revolution speed on the output side of said torque converter and determining the operating situation of said traveling means based on the torque converter speed ratio.

6. The control system for the traveling working vehicle according to claim 4,
wherein said modification control means comprises means for computing a first torque modification value (ΔTm) and a first revolution speed modification value (ΔNm) when said first determining means determines said engine as being in an overload state, means for computing a second torque modification value (α1) and a second, revolution speed modification value (β1) when said second determining means determines said traveling means as being in a state where said torque converter is nearly stalled, means for executing arithmetic operation of the first torque modification value (ΔTm) and the second torque modification value (α1) to decide a final torque modification value (ΔTma), means for executing arithmetic operation of the first revolution speed modification value (ΔNm) and the second revolution speed modification value (β1) to decide a final revolution speed modification value (ΔNma), means for computing a difference between a reference maximum absorption torque (Tb) and the final torque modification value (ΔTma), thereby obtaining a modified maximum absorption torque (Tm), and means for computing a difference between the target revolution speed (Np) of said engine, which is commanded from said input means, and the final revolution speed modification value (ΔNma), thereby obtaining a modified target revolution speed (Nm).

7. A control system for a traveling working vehicle comprising:

an engine;

a fuel injector for controlling a revolution speed of said engine;

traveling means including a torque converter for traveling, which is driven by said engine;

a variable displacement hydraulic pump driven by said engine; and working actuators driven by a hydraulic fluid delivered from said hydraulic pump, wherein said control system comprises:

pump torque control means for controlling an absorption torque of said hydraulic pump to be kept not exceeding a preset maximum absorption torque (Tm);

input means for commanding a target revolution speed (Np) of said engine;

state determining means for determining an operating state of said traveling working vehicle;

modification control means for modifying both a pump base torque (Tb) to obtain the maximum absorption torque (Tm) of said hydraulic pump and a target revolution speed (Np) of said engine depending on the determination result of said state determining means;

wherein said state determining means includes first determining means for determining a load state of said engine, second determining means for determining an operating situation of said traveling means, and third determining means for determining operating situations of said working actuators, and said modification control means performs modification to reduce each of the pump base torque (Tb) to obtain the maximum absorption torque (Tm) of said hydraulic pump and the target revolution speed (Np) of said engine when said first determining means determines said engine as being in an overload state, said second determining means determines said traveling means as being in a state where said torque converter is nearly stalled, and said third determining means determines said working actuators as being in a high load state.

8. The control system for the traveling working vehicle according to claim 7, wherein said third determining means comprises:

means for detecting load pressure of said hydraulic pump; and means for determining the operating situations of said working actuators (23a-23n) based on the load pressure of said hydraulic pump.

9. The control system for the traveling working vehicle according to claim 7, wherein said modification control means comprises means for computing a first torque modification value (ΔTm) and a first revolution speed modification value (ΔNm) when said first determining means determines said engine as being in an overload state, means for computing a second torque modification value (α1) and a second revolution speed modification value (β1) when said second determining means determines said traveling means as being in a state where said torque converter is nearly stalled, means for computing a third torque modification value (α2) and a third revolution speed modification value (β2) when said third determining means determines said working actuators as being in a high load state, means for executing arithmetic operation of the first torque modification value (AΔTm), the second torque modification value (α1) and the third torque modification value (α2) to decide a final torque modification value (ΔTma), means for executing arithmetic operation of the first revolution speed modification value (ΔNm), the second revolution speed modification value (β1) and the third revolution speed modification value (β2) to decide a final revolution speed modification value (ΔNma), means for computing a difference between a reference maximum absorption torque (Tb) and the final torque modification value (ΔTma), thereby obtaining a modified maximum absorption torque (Tm), and means for computing a difference between the target revolution speed (Np) of said engine, which is commanded from said input means, and the final revolution speed modification value (ΔNma), thereby obtaining a modified target revolution speed (Nm).

* * * * *